(No Model.)
W. J. WINGENROTH.
FRUIT GATHERER.
No. 403,500. Patented May 14, 1889.
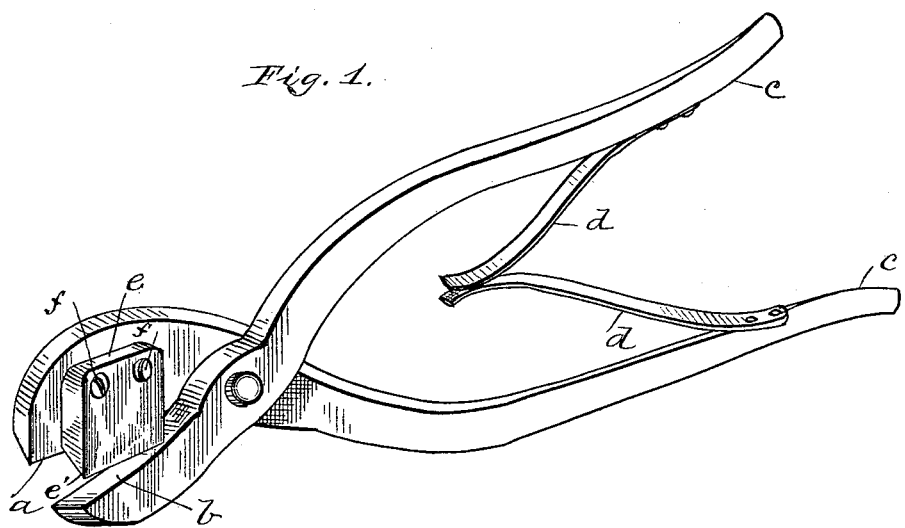
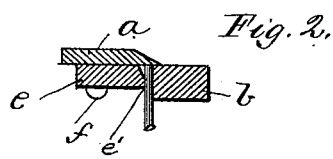
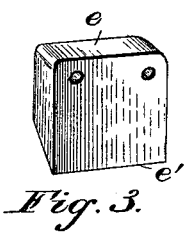
Witnesses:
H. E. Harrison
J. A. Herrow
Inventor
Wayne J. Wingenroth
Per O. D. Lewis
Att'y.

UNITED STATES PATENT OFFICE.

WAYNE J. WINGENROTH, OF WILKINSBURG, PENNSYLVANIA.

FRUIT-GATHERER.

SPECIFICATION forming part of Letters Patent No. 403,500, dated May 14, 1889.

Application filed October 4, 1888. Serial No. 287,219. (No model.)

*To all whom it may concern:*

Be it known that I, WAYNE J. WINGENROTH, a citizen of the United States, residing at Wilkinsburg, in the county of Allegheny and State of Pennsylvania, have invented certain new and useful Improvements in Fruit-Gatherers; and I do hereby declare the following to be a full, clear, and exact description of the invention, such as will enable others skilled in the art to which it pertains to make and use the same, reference being had to the accompanying drawings, which form a part of this specification.

My invention relates to an improved fruit-gatherer; and it consists of the peculiar construction and arrangement of parts, as will be hereinafter fully described, and particularly pointed out in the claim.

In the accompanying drawings, Figure 1 is a perspective view of an ordinary pruning-shears having my improvement attached thereto. Fig. 2 is a sectional cut through the shear-blades and rubber block, showing the manner in which the stem of the fruit is retained after the same has been cut. Fig. 3 is a perspective view of the rubber block detached from the blade of the fruit-gatherer.

To put my invention into practice with a pruning-shears such as are now in common use, consisting of the shear-blades $a$ $b$, and the handles $c$, having a flat spring, $d$, attached to each, adapted to open or separate the blades $a$ $b$ when the same have been closed, I provide a rectangular block or piece of rubber, $e$, or other soft and flexible material, and attach the same to the inner face of the cutting-blade $a$ in such a manner that the lower edge, $e'$, ⁻jects slightly below the edge of the blade ‿ knife $a$. This piece of rubber $e$, I secure to the blade by two screws, $f$, which may be removed and the shears used for pruning.

By reference to the drawings it will be noted that the rubber block is fixed to that lateral face of the blade $a$ contiguous to the other blade, $b$, of the shears, and that it is arranged in line with said blade $b$. By arranging the rubber block in this position, with one of its edges $e'$ projecting beyond the cutting-edge of the blade $a$, to which it is attached, and making the blade $b$ wider than the rubber block, the stem of the fruit can be firmly grasped and held without injury thereto while the shears are manipulated to sever the stem. As the edge $e'$ of the rubber block projects beyond the cutting-edge of the blade $a$, said edge of the block closes upon the stem and forces it against the wide edge of the blade $b$ before the shears close on the stem, (see Fig. 2,) and as the shear-blades are closed together that portion of the rubber block which is in contact with the stem is compressed (see Fig. 2) more or less, according to the diameter of the stem, and thus more effectually grips the stem between itself and the broad edge of the blade $b$. To better adapt the rubber block to firmly grip the stem between itself and the blade $b$, the edge $e'$ of said block is beveled or inclined from the outer lateral face of the block toward the shear-blade $a$, the inclination of the edge $e'$ of the rubber block and the shear-blade $a$ being in the same direction, as indicated in Fig. 2.

Having thus described my invention, what I claim, and desire to secure by Letters Patent, is—

The herein-described fruit-gatherer, consisting of the shear-blades $a$ $b$, pivoted laterally together, the blade $b$ having the broad flat edge adjoining the cutting-edge of the blade $a$, and a rubber block, $e$, detachably secured by transverse screws $f$ to the lateral face of the blade $a$ contiguous to the blade $b$, and arranged in line with the latter blade, said rubber block having one of its edges $e'$ beveled, as described, and projecting beyond the cutting-edge of the blade $a$, to which said block is attached, whereby the beveled edge $e'$ of the rubber block is adapted to close upon the stem of the fruit and grip the stem between itself and the broad edge of the blade $b$, substantially as and for the purpose described.

In testimony that I claim the foregoing I hereunto affix my signature.

WAYNE J. WINGENROTH. [L. S.]

In presence of—
   E. D. WINGENROTH,
   FRANK W. SMITH.